United States Patent [19]

Petrakis et al.

[11] Patent Number: 5,824,400
[45] Date of Patent: Oct. 20, 1998

[54] PLASTIC ARTICLE AND PROCESS FOR THE PREPARATION THEREOF

[75] Inventors: Jordanis Petrakis, Burscheid; Wolfgang Hoge; Torsten Leenaerts, both of Wuppertal, all of Germany; Marinus Alfenaar, Munstergeleen; Johannes G. M. Nieuwkamp, Limbricht, both of Netherlands

[73] Assignee: DSM N.V., Heerlen, Netherlands

[21] Appl. No.: 613,429

[22] Filed: Jan. 25, 1996

Related U.S. Application Data

[63] Continuation of PCT/N94/00183 Aug. 5, 1994.

[30] Foreign Application Priority Data

Aug. 5, 1993 [DE] Germany ............... 43 26 326.7

[51] Int. Cl.⁶ ............... B32B 7/02; C08J 9/00; C08L 53/00
[52] U.S. Cl. ............... 428/218; 264/46.1; 264/48; 264/54; 428/316.6; 428/317.9; 521/54; 521/55; 521/131; 521/142; 521/920; 525/89; 525/95; 525/232
[58] Field of Search ............... 521/54, 139, 920, 521/55, 131, 142; 525/89, 232; 428/304.4, 317.9, 318.6, 218, 316.6; 264/45.9, 46.1, 46.4, 48, 54

[56] References Cited

U.S. PATENT DOCUMENTS

| | | | |
|---|---|---|---|
| 4,130,535 | 12/1978 | Coran et al. | 260/33.6 |
| 4,212,787 | 7/1980 | Matsuda et al. | |
| 4,247,652 | 1/1981 | Matsuda et al. | |
| 4,311,628 | 1/1982 | Abdou-Sabet et al. | 260/33.6 |
| 4,677,133 | 6/1987 | Leicht | 521/51 |
| 4,997,707 | 3/1991 | Otawa et al. | |
| 5,070,111 | 12/1991 | Dumbauld | |
| 5,114,987 | 5/1992 | Cakmak et al. | |

FOREIGN PATENT DOCUMENTS

| | | |
|---|---|---|
| 0 071 662 | 2/1983 | European Pat. Off. |
| 0 405 227 | 1/1991 | European Pat. Off. |
| 3039082 | 2/1982 | Germany. |
| 3118429 | 11/1982 | Germany. |
| 3435939 | 9/1984 | Germany. |
| 4121552 | 1/1992 | Germany. |
| 2 125 797 | 3/1984 | United Kingdom. |

OTHER PUBLICATIONS

Gummi–ein Werkstoff nach Mass, Continental auf der Hannover Messe '88.
W. Hofmann & R. Koch, Neue Entwicklungen aug dem Gebiet des thermoplastischen Elastomers Alcryn, Kautschuk & Gummi, Kunststoffe, Jahrgang, Nr. 9/88.

*Primary Examiner*—James J. Bell
*Assistant Examiner*—Blaine R. Copenheaver
*Attorney, Agent, or Firm*—Cushman, Darby & Cushman IP Group of Pillsbury, Madison & Sutro

[57] ABSTRACT

The present invention relates to a plastic article formed from several foamed thermoplastic elastomers, such as a thermoplastic polyolefin elastomer based on polypropylene and a vulcanized elastomer at least one of an elastomeric styrene/ethylene/butylene/styrene block copolymer, an elastomeric styrene/butadiene/styrene block copolymer, a thermoplastic elastomer based on polypropylene and an elastomeric styrene/ethylene/butylene/styrene block copolymer and a thermoplastic elastomer based on polypropylene and an elastomeric styrene/butadiene/styrene block copolymer. The present invention further provides plastic articles based on a blend of thermoplastic elastomers and thermoplastic elastomer olefins. The invention further provides a process for making these articles.

22 Claims, No Drawings

PLASTIC ARTICLE AND PROCESS FOR THE PREPARATION THEREOF

This is a continuation of PCT/NL94/00183 Aug. 5, 1994.

The invention relates to a foamed plastic article with properties like those of foamed rubber as well as to a process for the preparation of such a plastic article.

A known plastic article, designed as sealing profile, consists of a metal supporting profile with a PVC sheathing. To the PVC sheathing a foam profile is bonded. Although such profiles have been in use for many years already, they do have disadvantages and they no longer meet today's technical demands. It is considered a disadvantage of the known profiles that PVC and foamed rubber cannot be coextruded, which means that use must be made of a separate extrusion line for the preparation of the supporting profile and separate use is to be made of an extrusion line for the foam profile, with corresponding costs. A further disadvantage is the expenditure needed for bonding the separate profiles together, which costs a lot of time and money, while moreover the bond obtained is not fully reliable. Yet another disadvantage of the conventional profiles is that the use of rubber makes colouring impossible. Lastly, the known profiles cannot be recycled due to the use of different basic materials and adhesives, which is considered to be a very serious drawback, seeing that nowadays efforts are made to find ways to re-use basic materials.

It is the aim of the invention to provide a foamed plastic article with properties like those of foamed rubber and to provide a process for its preparation by which the above-mentioned disadvantages are avoided.

In concrete terms, this aim is achieved in that the foamed plastic article comprises several thermoplastic elastomers (TPEs). In particular, this aim is achieved in that the thermoplastic elastomers are a combination of a TE(EM–X–PP) [polypropylene (PP)-elastomer (EM) blend with a dynamically (in-situ) crosslinked elastomer component] and at least one of PEBBS [styrene-ethylene/butylene-styrene ABA block copolymer] and PBBS [styrene-butadiene-styrene-ABA block copolymer]. There is advantage in using TE(EM–X–PP) and at least one of PEBBS and TE(PEBBS+PP) as thermoplastic elastomers, and it has been found to be highly advantageous to use about four parts of TE(EM–X–PP) of a Shore (A) hardness of 40 and one part of at least one of PEBBS and TE(PEBBS+PP) of a Shore (A) hardness of 30 about three parts of TE(EM–X–PP) of a Shore (A) hardness at least one of 60 and two parts of PEBBS and TE(PEBBS+PP) of a Shore (A) hardness of 30.

The article according to the invention is substantially free of chlorine, environmentally sound and free of substances that are detrimental to health. The new material composition according to the invention guarantees complete recyclability. The new article according to the invention can be made available with a Shore (A) hardness of about 25 to 85 and a Shore (D) hardness of about 30 to 45, and its preparation poses no problems. A further advantage is the high light, UV and ozone resistance as well as a good compression set, also when heated at 70° to 100° C.

When the demands to be met are lower, the foamed plastic article may also consist of the following thermoplastic elastomers, viz. (1) TE(EM–X–PP) and/or TE(EM+PP) and (2) at least one of PBBS and TE(PBBS+PP).

The aim of the invention can also be achieved by means of a foamed plastic article comprising thermoplastic elastomers (TPEs) and one or more thermoplastic olefins (TPE-O). As known, TPE's are at least partially crosslinked and TPE-O's are non-crosslinked. Preference is then given to the use of material compositions such as (1) TE(EM–X+PP), (2) at least one of PEBBS and TE(PEBBS+PP) and (3)TE(EM+PP). Preference is also given to (1) TE(EM–X+PP), (2) at least one of PBBS and TE(PBBS+PP) and (3) TE(EM+PP). In a series of practical tests, a plastic article comprising about four parts of TE (EM–X–PP) of a Shore (A) hardness of 80, one part of at least one of PEBBS and TE (PEBBS+PP) (or one part of at least one of PBBS and one part of at least one part of one of TE (PBBS+PP)) of a Shore (A) hardness of 30 and three parts of TE (EM+PP) of a Shore (D) hardness of 30 proved to be particularly advantageous.

As elastomer in the TE(EM–X–PP) and TE(EM+PP) any suitable rubber can be used, which can be (dynamically) crosslinked. Reference can be given to (halo)butyl co- and terpolymer rubber, natural rubber, NBR and preferably to ethylene propylene copolymer rubber (EPM) and more preferably to ethylene propylene diene terpolymer rubber (EPDM).

In the plastic article according to the invention foaming agents, preferably chemical foaming agents have been used during the preparation, while pigments may also be incorporated.

In a preferred embodiment the plastic article according to the invention has the form of an extruded profile strip. The profile strip can then have at least one relatively hard and at least one relatively soft section, the at least one relatively hard section being solidly connected with the at least one relatively soft section by means of coextrusion. The at least one relatively soft section of the profile strip can advantageously take the form of a sealing lip or a sealing tube.

In another preferred embodiment of the invention the plastic article is an injection moulded part. In this case, too, a soft-to-hard or hard-to-soft bond can be achieved by injection.

In the process according to the invention for the preparation of a plastic article use is made of a conventional plastic processing equipment to which is added a mixture comprising TE (EM–X–PP) and/or TE (EM+PP) components, PEBBS and/or TE (PEBBS+PP) components or PBBS and/or TE (PBBS+PP) components and chemical foaming agents. The amount of the foaming agent is generally between 0.5 and 2.5 parts by weight per 100 parts of the polymeric ingredients. In the plastic article of the invention generally the amount of the PEBBS or PBBS containing thermoplastic elastomer comprises 1–75% by weight of the total amount of thermoplastic elastomer.

The preparation of the TE(EM–X–PP) can take place separately from the preparation of the plastic article, but can also take place during the preparation of the plastic article of the invention. The degree of crosslinking of the rubber in the TE(EM–X–PP) should be at least 70% and preferably more than 85% (to be determined by extraction in boiling xylene).

The material composition according to the invention has made it possible to prepare plastic articles with elastomeric properties via extrusion and injection moulding, in a satisfactory quality, and this is to be considered surprising, for attempts with a TPE component and a (chemical) foaming agent or with a TPE-O component and a (chemical) foaming agent yielded results that were absolutely useless. The defects that were found included the following: inhomogeneous foam structures, uncontrolled swelling of the extrudate, cracking of the surface, an insufficient degree of foaming, very low extrusion speeds, embrittlement of the extrudate, clear deterioration of the mechanical properties, reduction of the tensile strength and elongation, a rough and grey surface, crumbling of the extrudate when it leaves the equipment and formation of blisters and pimples on the surface.

The aim formulated in the preamble can preferably be achieved by means of a process which according to the invention uses a mixture consisting of (1) TE(EPDM–X+PP) components, (2) at least one of PEBBS, PBBS, TE(PEBBS+PP) and TE(PBBS+PP) components and (3) (chemical) foaming agents.

Finally, a preferred process for the preparation of a plastic article according to the invention consists in the use of polymer material based on (1) TE(EM–X+PP), and (2) at least one of PEBBS and TE(PEBBS+PP) or at least one of PBBS and TE(PBBS+PP) and optionally (3) TE(EM+PP) components and chemical foaming agents, after these have been compounded, which compounding has to take place at a temperature below the activation temperature of the foaming agents. In this way an extremely high material homogenity is achieved.

The process according to the invention can be elaborated by the addition of pigments and also in that the mixtures or compounds are extruded to profile strips or injected to articles. The plastic articles can also be combined with a metal supporting profile.

With the measures according to the invention extruded and/or injection moulded articles from foamed TPE/TPE-O blends for internal and external use (especially for vehicles) can be obtained or be prepared in excellent quality at low production costs. The special nature and the composition of the TPE/TPE-O foam blends makes it also possible to use them in combination with non-foamed materials by means of coextrusion, injection moulding and compression moulding, which takes place in the Shore hardness range from 25 A to 45 D and at densities between 500 and 900 kg/m$^3$. Further the measures according to the invention open up colouring possibilities, a smooth, closed surface and properties similar to those of foamed rubber in the Shore A range. In particular the blend variants are substantially free of chlorine and environmentally friendly and they can be recycled without limitations.

The foaming agents which can be used are known in the art; they include evaporatable agents like water or aliphatic hydrocarbons or decomposable agents (for instance: exothermic and/or endothermic foaming agents, e.g. on the basis of modified azodicarbon amide). Reference can also be given to the information given in U.S. Pat. No. 4,918,111, column 3, lines 27 ff.

Due to the mixture, according to the invention, of compatible TPE/TPE-O's and the addition of special (chemical) foaming agents it has been possible to produce a blend which exhibits the following properties and processing potentials:

PVC (chlorine) free environmentally friendly free from health hazardous substances recyclable to produce equivalent articles Shore hardness (A) 25–85

Shore hardness (D) 30–45 extrudable with smooth and closed surface chemical properties comparable to those of rubber mixtures mechanical and physical properties according to specifications extrudable and injection mouldable injection mouldable via the port extrudable in the form of foamed articles extrudable on conventional equipment and tools coextrudable with TPE's and/or TPE-O's homogeneous foam structure (fine porous)

density from 500 to 900 kg/m$^3$

Preferably, the plastic article exhibits a closed and smooth surface with a fine porous and homogeneous foam structure.

In a further embodiment of the invention, it is a feature of the manufacture of the extruded articles that by means of cutting elements provided within or outside the extrusion tool, even in the case of no tool contact, the melt is cut as desired in the flow direction. In this way, one or more extruded articles having a closed and smooth surface at the cutting faces can be obtained in one production run.

In another embodiment of the invention, the surface of the article is given a textile-like finish, making it scratch and abrasion resistant.

Detail terminology used in the foregoing has been taken from the published report 'Nomenclature and testing', by Dipl.Ing. Ekkehard Gorski, München (conference of 6 and 7 Oct. 1992, Mainfrankensäle, Veitshöcheim, pp. 25–29 of the annex).

The abbreviation "TE" stands for thermoplastic elastomers. The abbreviation "EM" stands for elastomer. The abbreviation "PP" stands for polypropylene. The abbreviation "PEBBS" stands for elastomeric styrene ethylene butylene styrene block copolymer. The abbreviation "PBBS" stands for elastomeric styrene butadiene styrene block copolymer. The abbreviation "EPM" stands for ethylene propylene copolymer rubber. The abbreviation "EPDM" stands for ethylene propylene diene terpolymer rubber. In a case such as TE(EPDM–X+PP) and TE(PEBBS+PP), the TE stands for a thermoplastic elastomer and the abbreviation parenthetical is for the polymers as above described, wherein "X" stands for crosslinked and the "+" stands for blend.

The invention will be illustrated with the following examples, without being restricted thereto.

EXAMPLE I, relating to manufacture of a profile strip with rubber-like properties:

80 parts of TE(EPDM–X–PP) (granulate) with a Shore (A) hardness of 40, 20 parts of TE(PEBBS+PP) (granulate) with a Shore (A) hardness of 30 and 2 parts of an azodicarbon amide as a chemical foaming agent, optionally with addition of colouring pigments, are mixed together (or compounded), supplied to an extruder and extruded at an operating temperature of 170° to 210° C.

Result: fine pores, even distribution, closed surface, silky mat, Shore A=25, foamed.

EXAMPLE II, relating to the manufacture of an injection moulded article with properties of foamed rubber:

60 parts of TE(EPDM–X–PP) (granulate) with a Shore (A) hardness of 60, 40 parts of TE(PEBBS+PP) (granulate) with a Shore (A) hardness of 30, and 0.5 to 2.5% of an azodicarbonamide as a chemical foaming agent are mixed together and injection moulded at a temperature of 190° to 240° C. to an article.

Result: fine pores, even distribution, closed surface, good feel, Shore (A)=30, foamed.

What we claim is:

1. A foamed plastic article comprising a plurality of thermoplastic elastomers wherein said thermoplastic elastomers comprise:

(1) a thermoplastic polyolefin elastomer based on a blend of a polypropylene and a crosslinked elastomer, and (2) a) or b), wherein a) is at least one of (i) elastomeric styrene/ethylene/butylene/styrene block copolymer and (ii) an elastomeric styrene/butadiene/styrene block copolymer, and wherein b) is at least one of (i) a thermoplastic elastomer based on a blend of a polypropylene and an elastomeric styrene/ethylene/butylene/styrene block copolymer and (ii) a thermoplastic elastomer based on a blend of a polypropylene and an elastomeric styrene/butadiene/styrene block copolymer.

2. A foamed plastic article according to claim 1, wherein said plurality of thermoplastic elastomers further comprise an additional thermoplastic polyolefin elastomer based on a blend of a polypropylene and a non-crosslinked elastomer.

3. A foamed plastic article according to claim 2, wherein said foam plastic article comprises:
  (a) a thermoplastic polyolefin elastomer based on a blend of a polypropylene and a crosslinked elastomer,
  (b) a thermoplastic polyolefin elastomer based on a blend of a polypropylene and an elastomer, and
  (c) at least one thermoplastic elastomer selected from the group consisting of (i) an elastomeric styrene/ethylene/butylene/styrene block copolymer and (ii) a thermoplastic elastomer based on a blend of a polypropylene and an elastomeric styrene/ethylene/butylene/styrene block copolymer.

4. A foamed plastic article according to claim 2, wherein said foamed plastic article comprises:
  (a) a thermoplastic polyolefin elastomer based on a blend of a polypropylene and a crosslinked elastomer,
  (b) a thermoplastic polyolefin elastomer based on a blend of a polypropylene and an elastomer, and
  (c) at least one member selected from the group consisting of (i) an elastomeric styrene/butadiene/styrene block copolymer and a thermoplastic elastomer based on a blend of a polypropylene and (ii) an elastomeric styrene/butadiene/styrene block copolymer.

5. A foamed plastic article according to any one of claims 1, 2, 3 or 4, wherein the elastomer in said thermoplastic polyolefin elastomer based on a blend of a polypropylene and a crosslinked elastomer is EPM or EPDM.

6. A foamed plastic article according to any one of claims 2, 3, or 4, wherein the elastomer in said additional thermoplastic polyolefin elastomer based on a blend of a polypropylene and an elastomer is EPDM or EPM.

7. A foamed plastic article according to claim 1, wherein said foamed plastic article comprises:
  (a) about four parts of a thermoplastic polyolefin elastomer having a Shore (A) hardness 40 which is based on a blend of a polypropylene and a crosslinked elastomer and
  (b) at least one part of one member selected from the group consisting of
    (i) an elastomeric styrene/ethylene/butylene/styrene block copolymer and
    (ii) a thermoplastic elastomer based on a blend of a polypropylene and an elastomeric styrene/ethylene/butylene/styrene block copolymer, wherein said at least one member has a Shore (A) hardness 30.

8. A foamed plastic article according to claim 1, wherein said foamed plastic article comprises:
  (a) about three parts of a thermoplastic polyolefin elastomer having a Shore (A) hardness of 60 which is based on a blend of a polypropylene and a crosslinked elastomer and
  (b) about two parts of at least one member selected from the group consisting of
    (i) an elastomeric styrene/ethylene/butylene/styrene block copolymer and
    (ii) a thermoplastic elastomer based on a blend of a polypropylene and an elastomeric styrene/ethylene/butylene/styrene block copolymer, wherein said at least one member has a Shore (A) hardness 30.

9. A foamed plastic article according to claim 1, wherein when said foamed plastic article was prepared, a chemical foaming agent was used in said preparation.

10. A foamed plastic article according to claim 1, wherein said foamed plastic article further comprises at least one color pigment.

11. A foamed plastic article according to claim 1, wherein said foamed plastic article comprises an extruded profile strip.

12. A foamed plastic article according to claim 11, wherein said profile strip has at least one relatively hard and at least one relatively soft section, relative to each other.

13. A foamed plastic article according to claim 12, wherein said profile strip is a coextruded product whereby said at least one relatively soft section and said at least one relatively hard section are solidly connected with one another.

14. A foamed plastic article according to claim 12 or 13, wherein the at least one relatively soft section of said profile strip forms a sealing lip or sealing tube.

15. A foamed plastic article according to claim 1, wherein said foamed plastic article is an injection molded article.

16. A process for manufacturing a foamed plastic article according to claim 1, wherein said process comprises:
  preparing a foamable composition comprised of said plurality of thermoplastic elastomers and at least one foaming agent; and
  preparing said foamed plastic article therefrom.

17. A process for the manufacture of a foamed plastic article according to claim 16, wherein said plurality of thermoplastic elastomers and said at least one foaming agent are first compounded together, and said foaming agent is at least one chemical foaming agent, said compounding taking place at a temperature below the activation temperature for said chemical foaming agent.

18. A process according to claim 17, wherein said foamed plastic article is prepared using a foam extruder, said foam extruder having cutting elements such that the foamed extrudate is cut to form the foamed article.

19. A process according to claim 16, wherein a surface of the foamed plastic article receives a finish having the appearance of a textile, whereby said surface is rendered scratch and abrasion resistant.

20. A precursor of a foamable plastic article comprising a plurality of thermoplastic elastomers and, at least one foaming agent in admixture with said thermoplastic elastomers, wherein said thermoplastic elastomers comprise:
  (1) a thermoplastic polyolefin elastomer based on a blend of a polypropylene and a crosslinked elastomer, and
  (2) a) or b),
  wherein a) is at least one of (i) elastomeric styrene/ethylene/butylene/styrene block copolymer and (ii) an elastomeric styrene/butadiene/styrene block copolymer, and
  wherein b) is at least one of (i) a thermoplastic elastomer based on a blend of a polypropylene and an elastomeric styrene/ethylene/butylene/styrene block copolymer and (ii) a thermoplastic elastomer based on a blend of a polypropylene and an elastomeric styrene/butadiene/styrene block copolymer.

21. A precursor according to claim 20, wherein said plurality of thermoplastic elastomers further comprise an additional thermoplastic polyolefin elastomer based on a blend of a polypropylene and a non-crosslinked elastomer.

22. A precursor according to claim 20, wherein said precursor contains at least one chemical foaming agent.

* * * * *